UNITED STATES PATENT OFFICE.

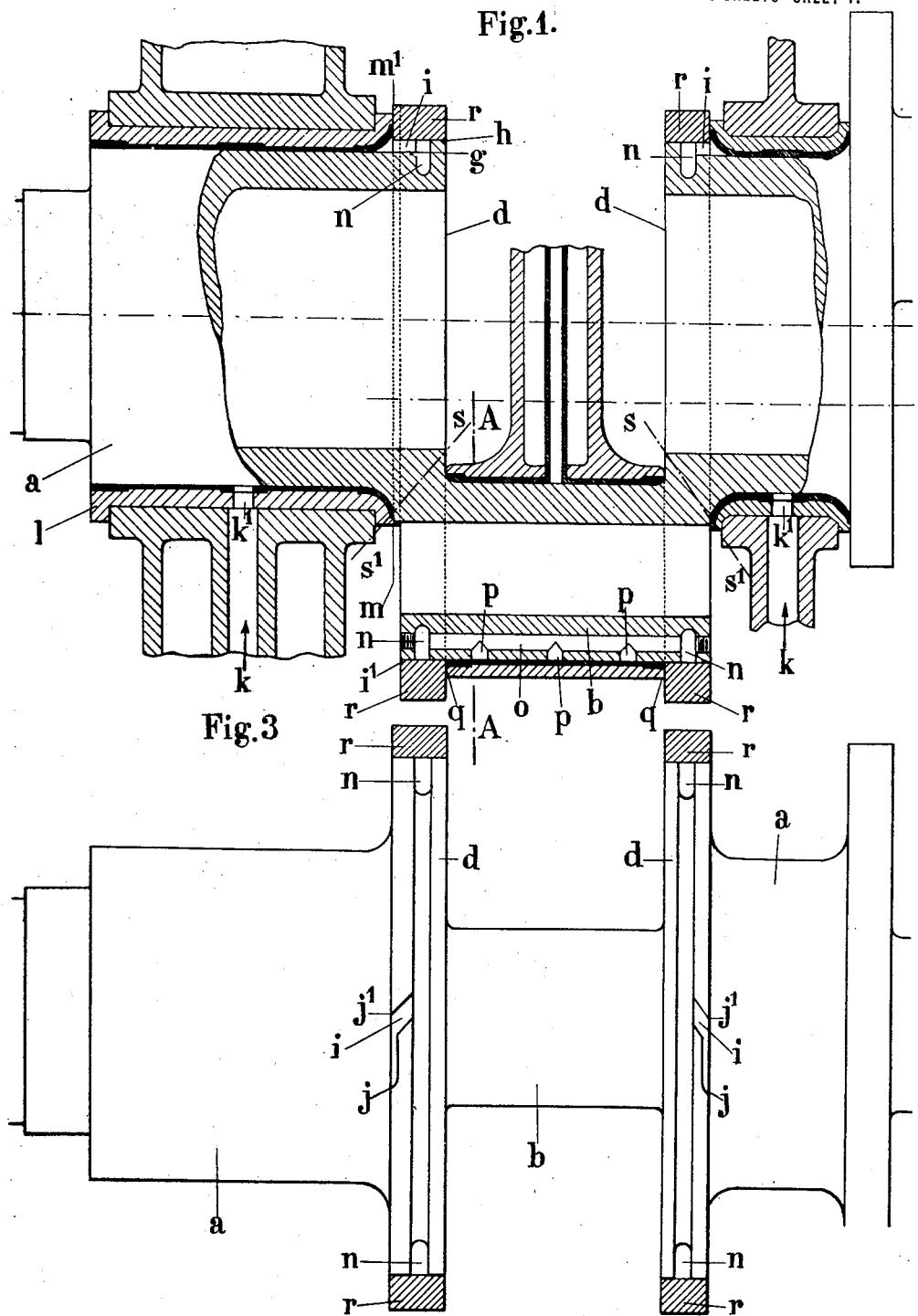

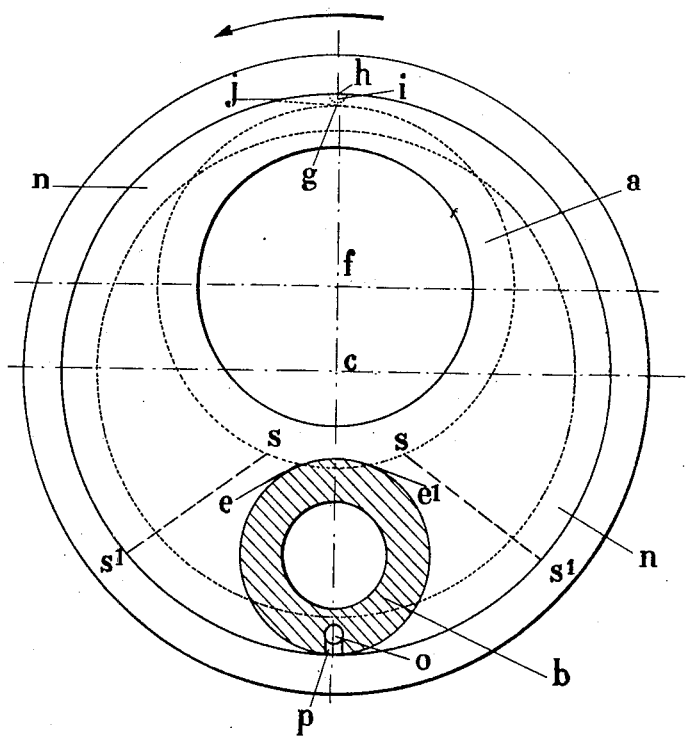

EDOUARD LABITOTIÈRE, OF BEZONS, FRANCE.

CRANK FOR LIGHT HIGH-SPEED ENGINES.

1,342,683.

Specification of Letters Patent.  Patented June 8, 1920.

Application filed June 11, 1919. Serial No. 303,515.

*To all whom it may concern:*

Be it known that I, EDOUARD LABITOTIÈRE, of 2 Quai de Seine, Bezons, Seine, France, have invented Improvements in or Relating to Cranks for Light High-Speed Engines, of which the following is a clear, full, and exact description.

In the construction of cranks for light engines, attempts have been made to replace the usual rectangular arms by disks centered on the axis of the journals. Since these disks may be fairly thin, and yet of sufficient strength, it is possible to reduce the length of the engine and consequently lessen the weight of the whole, without decreasing the length of support in the bearings, and furthermore the crank can be perfectly balanced, with ease. Nevertheless, such construction of disk cranks presents serious difficulties in manufacture, and leads to considerable waste of material.

According to the prior state of the art it is old that the journals and crank pins of a crank for light high-speed engines having circular flanges, are essentially arranged in relation to the axis of the circular flanges, the theoretical diameter of which thus becomes equal to the sum of the diameters of a journal and a crank pin. Compared with the known cranks, in which the disks are concentric with the journals, the eccentric arrangement enables a width to be gained equal to the diameter of a crank pin. In practice, the journals and crank pins overlap to a certain degree which insures greater strength than would be obtained if their circumferences were tangential in the sectional plane.

A feature of this invention is the provision of suitable conduits enabling abundant and complete lubrication to be obtained by utilizing centrifugal force, and the provision around the circular flanges of a hoop, the function of which is, on the one hand, to close an oil channel, and on the other hand, to strengthen the flanges and prevent their fracture at the most delicate parts.

In the accompanying drawings, Figure 1 is a longitudinal vertical section of one form of crank constructed in accordance with this invention; Fig. 2 is a cross section on the line A—A Fig. 1; and Fig. 3 is a plan thereof, the friction-tight bands being shown in section.

As can be seen, more particularly in Fig. 2, the journals $a$ and crank-pins $b$ are eccentrically arranged in relation to the center $c$ of the circular flanges $d$. The theoretical diameter of said flanges thus becomes equal to the sum of the diameters of a crank pin and a journal, and consequently, in comparison with crank disks that are concentric with the journals, there is a gain in width equal to the diameter of a crank pin. In practice, the journals $a$ and crank pins $b$ overlap to a certain extent, as indicated at $e$ $e^1$, Fig. 2, which insures greater strength than if the circumferences of the journals and crank pins were tangential in the sectional plane.

It should be noted, on the other hand, that the circumference of the flange $d$ extends beyond the radius $f$—$g$ of the journal $a$, for a distance of about 3–4 millimeters, indicated by $h$—$g$, Fig. 2. This length $h$—$g$ is equal to the width of a circular opening $i$ of a recess $j$ $j^1$, Fig. 3, intended to receive lubricating oil at the side of the flange $d$.

Lubrication is effected under the following conditions:

The oil entering under pressure at $k$ (Fig. 1) in the direction of the arrow, spreads through oil grooves from the center toward the outside of the bearing $l$. On issuing from the latter on the plane $m$, $m^1$ (Fig. 1), it is lapped up at each revolution by the recess $j$ $j^1$. In consequence of the obliquity of the opening $i$ of the recess $j$ $j^1$ (Fig. 3), and the rotary movement, the oil passes into a peripheral channel $n$, in the flange $d$, but, inasmuch as the rotation takes place around the center $f$, and at a speed of 1,000–3,000 revolutions per minute, it will be evident that, under the influence of centrifugal force acting from $i$ toward $i^1$ (Fig. 1), the oil entering at $i$ must pass along the channel $n$, from which it flows into a tubular conduit $o$ (Fig. 1), provided in the crank pin $b$. The oil then passes through holes $p$, leading from the conduit $o$, and lubricates the bearing of the connecting-rod head, whence it falls, through slots $q$, into the crank case of the engine.

The lubrication could not, however, be effected under the aforesaid conditions if the channel $n$ were open, because, in such case, the oil would be forthwith thrown out by centrifugal action.

The channel $n$, however, is closed by a hoop $r$, which is shrunk on around the flanges $d$, so that the channel $n$ communicates with the outside only through the orifice $i$ (through which the oil is admitted) and through the outlet holes $p$. This is one of the functions of the hoop $r$, which is intended, on the other hand, to play a still further part, of essential importance, consisting in the concentric tightening effect which it exerts in a direction opposed to that of the tendency to fracture to which all the cranks are subjected; and it thus considerably increases the strength of the members which, by reason of their shape and of the strain they undergo, are the most liable to fracture. If one bears in mind the lines $s\ s^1$ (Figs. 1 and 2), which are the weak points of these members, it will be understood that if fracture occurred along said lines, the hoop $r$ would keep the edges of the fractured part in absolute contact, and would thus prevent the serious accidents liable to ensue. In fact, one of the effects of the hoop is to prevent the occurrence of fracture, as a shrunk-on ring has a far greater strength than if it formed an integral part of the reinforced members.

Claims:

1. In a crank shaft having crank pins and circular flanges, a closed oil groove in the flanges, an oblique opening in the flange leading to the groove, to discharge oil into the groove, a conduit in the crank-pin, and leading from the groove and perforations in the conduit, to discharge the oil from the conduit.

2. In a crank shaft having crank pins and circular flanges, a closed oil groove in the flanges, a recess in the flanges with an oblique opening into the groove, to discharge oil into the groove, a conduit in the crank-pin, and leading from the groove, and perforations in the conduit, to discharge the oil from the conduit.

3. In a crank shaft having circular flanges, an oil groove in the periphery of the flanges, and a hoop over the groove to close the same.

4. In a crank shaft having crank-pins and circular flanges, an oil groove in the flanges, a recess in the flanges with an oblique opening into the groove, an oil conduit in the crank-pin, leading from the groove, and perforations in the conduit, and hoops on the flanges over the oil grooves for closing the oil circuit.

5. In a crank shaft having crank-pins and circular flanges, in which there is the well-known eccentric arrangement of the journals and crank-pins in relation to the axis of the circular flanges, means for insuring lubrication by the application of centrifugal force, comprising an inlet conduit to the journals for the oil, means whereby the oil is spread to the ends of the journals, a recess in the circular flanges with oblique openings, a circular closed channel in the flange, a tubular conduit in the crank-pin, and perforations in the conduit.

6. In a crank with circular flanges for light high speed motors, the combination with the known eccentric arrangement of the journals and crank-pins in relation to the axis of the circular flanges, means for insuring the lubrication of the crank by the application of centrifugal force, comprising an inlet conduit for the oil, a recess in the flanges with an oblique opening, a circular channel in the flange, a tubular conduit in the crank-pin and holes introduced in this conduit and means for closing the oil circuit consisting in hoops applied around the flanges.

7. In a crank shaft having crank-pins and circular flanges, in which there is the well-known eccentric arrangement of the journals and crank-pins in relation to the axis of the circular flanges, means for insuring lubrication by the application of centrifugal force, comprising an inlet conduit to the journals for the oil, means whereby the oil is spread to the ends of the journals, a recess in the circular flanges with oblique openings, a circular channel in the periphery of the flanges, a hoop over the channel closing the same, a tubular conduit in the crank-pin, and perforations in the conduit.

The foregoing specification of my improvements in or relating to cranks for light high-speed engines, signed by me this nineteenth day of May, 1919.

EDOUARD LABITOTIÈRE.